United States Patent [19]

Short, Jr.

[11] 4,453,605

[45] Jun. 12, 1984

[54] DRILL BIT AND METHOD OF METALLURGICAL AND MECHANICAL HOLDING OF CUTTERS IN A DRILL BIT

[75] Inventor: Lot W. Short, Jr., Dallas, Tex.

[73] Assignee: NL Industries, Inc., Houston, Tex.

[21] Appl. No.: 259,182

[22] Filed: Apr. 30, 1981

[51] Int. Cl.³ ............................................. E21B 10/52
[52] U.S. Cl. ................... 175/410; 76/108 A; 76/DIG. 11; 76/DIG. 12; 228/255; 29/447
[58] Field of Search ............... 175/409, 410, 411, 329, 175/374, 375, 393; 76/108 A, 101 E, DIG. 11, DIG. 12; 29/447; 228/255, 122, 135, 136

[56] References Cited

U.S. PATENT DOCUMENTS

| | | | |
|---|---|---|---|
| 3,294,186 | 12/1966 | Buell | 175/410 |
| 3,894,673 | 7/1975 | Lowder et al. | 76/DIG. 12 |
| 4,098,363 | 7/1978 | Rohde et al. | 175/329 |
| 4,156,329 | 5/1979 | Daniels et al. | 175/329 |
| 4,157,122 | 6/1979 | Morris | 29/447 |
| 4,186,628 | 2/1980 | Bonnice | 76/108 A |
| 4,200,159 | 4/1980 | Peschel et al. | 175/329 |
| 4,225,322 | 9/1980 | Kremeyer | 175/329 |
| 4,276,788 | 7/1981 | van Nederveen | 76/108 A |
| 4,327,473 | 5/1982 | Somerville | 29/447 |

FOREIGN PATENT DOCUMENTS 761808 10/1966 Canada .............................. 175/411
2056382 11/1970 Fed. Rep. of Germany ...... 175/410

Primary Examiner—Stephen J. Novosad
Assistant Examiner—William P. Neuder
Attorney, Agent, or Firm—William E. Johnson, Jr.; Douglas H. May, Jr.; Carl O. McClenny

[57] ABSTRACT

Disclosed is a method and apparatus for mechanically and metallurgically holding a cutter in a drill bit pocket. The method includes using powder metallurgy techniques in the formation of a drill bit member having a plurality of pockets configured to inhibit displacement of cutters out of the pockets in a direction transverse to the drill bit working surface. The method further includes the steps of metallurgically bonding and mechanically engaging the cutter with the cutter pocket. The drill bit manufactured in accordance with the methods of the present invention include a carbide menstrum drill bit head having a working surface with a plurality of fluid courses and nozzles thereon in adjacent relationship with a plurality of cutter blade bands comprising a series of cutter pockets having cutters disposed therein in a fashion parallel with the working surface.

9 Claims, 6 Drawing Figures

DRILL BIT AND METHOD OF METALLURGICAL AND MECHANICAL HOLDING OF CUTTERS IN A DRILL BIT

BACKGROUND OF THE INVENTION

The invention relates to drill bits and methods of manufacturing drill bits, and is particularly applicable to drag type bits. More specifically, the present invention relates to drill bits formed by powder metallurgy wherein the cutter assemblies are brazed into substantially enclosed, dimensionally controlled pockets formed in the bit matrix.

The use of drag type drill bits in the drilling of wells, particularly oil and gas wells, is well known. The typical drag type drill bit serves to transfer the weight of the drill string to the bottom of the borehole. The protruding cutters on the bottom surface of the drill bit serve to cut into the formation as the drill bit rotates. In extremely hard formations, the cutters essentially crush or fracture the formation by means of the large compressive force applied to the formation. In such hard formations, the cutters may take form of relatively small diamonds, e.g., 1/10 karat. In soft formations, the drag type drill bit essentially plows through the formation. The typical drill bit used in relatively soft formations may utilize large cutters, e.g., 2 karat.

Numerous considerations must be taken into account in the design of a drag type drill bit. As mentioned above, the cutter size is typically dictated by the hardness of the formation. Furthermore, the cutter may be chosen to have a specific profile, e.g., round or V-shaped. The concentration and placement of the diamonds along the face of the drill bit are critical to drill performance.

Careful attention must be given to the hydraulic characteristics of the bit since the drill bit must remain relatively cool and the cuttings must be promptly swept away from the drilling interface so that they are not reground. To this end, intricately designed waterways or fluid courses are provided on the face of the drill bit to direct the drilling mud across the face of the drill bit to effect cooling and cleaning. Typical hydraulic designs provide for either radial flow or circumferential flow, or some combination thereof. The hydraulics of the bit are also affected by the "profile" of the bit, i.e., the radius of curvature at the face of the bit.

Commercial drag type drill bits presently in use are typically formed by powder metallurgy techniques wherein a graphite mold is made to the shape of the bit. Depressions are carefully located in the mold and natural diamond cutters are glued into place in the depressions. A tungsten carbide powder is placed into the mold and infiltrated in a furnace cycle with a copper alloy with a steel shank in place. The maximum temperature in the furnace cycle may be on the order of 2200° F. The bit is allowed to drop out of the mold and is finished by welding to the steel shank an extension including the pin, and final machining.

Recent developments in the manufacture of drag type drill bits suggest that synthetic polycrystalline diamond drill blanks may be utilized as the cutters in such bits. These synthetic cutters have the unique advantage of being uniformly shaped, as opposed to the varying shapes of natural diamonds. However, present synthetic diamond drill blanks cannot be placed in the matrix prior to furnacing as can natural diamonds because the synthetic diamond cannot withstand temperatures on the order of 2200° F.

Synthetic polycrystalline diamonds in a disc form have been brazed directly onto the matrix of drag drill bits for use in soft formations. To date, the synthetic diamond discs which have been secured to drag type drill bits have been relatively large, e.g., ½ inch in diameter, because of limitations in the reliable attachment of the cutter to the drill bit matrix. Because the cutters are not located in a single plane, some form of positive fixturing must be used when attaching the cutters to the previously formed and furnaced drill bit head.

It has been proposed to use dead weights and various camming arrangements to fixture synthetic diamond cutters during brazing operations. However, such fixturing techniques have proven extremely complex and unreliable. It also has been suggested to fixture the synthetic diamond cutters by the use of shims of a high expanding metal that expand during the heating of the brazing operation and are removable upon cooling. This approach has also proved disadvantageous. Thus, it can be seen that there is an acute need for a drill bit having securely attached cutters, for example, synthetic polycrystalline diamond cutters, attached after furnacing of the bit head matrix. Improved attachment methods make possible the use of relatively small cutters for use in medium and hard formations.

Several methods for tangentially attaching cutters to the drill bit using brazing techniques have been proposed. In methods presently used, it has been found that simple metallurgical brazing normally results in inadequate securement of the cutter in the cutter pocket. Presently in the art, brazing foil is circumferentially wrapped around a drill blank or cutter and fit into the cutter pocket in the drill bit head. The brazing foil is normally 0.003 inches in thickness. The industry standard is wrapping at least three times around the circumference of the cutter to achieve any brazing at all. Thus, the tolerance between the cutter and the cutter pocket must be at least three times the thickness of the brazing foil or 0.009 of an inch per side. In order to fit into the cutter pocket, the tolerance must be dimensionally greater than 0.009 of an inch. It is known that upon furnacing the brazing material approximately 40% of the volume of the material is lost. The tolerances are great in order to achieve the wrapping of the foil and fitting into the pocket on the bit head. A "puddling" results with the brazing material collecting at the bottom of the pocket and attaching the cutter to the pocket only at that point.

For use of the Stratapax TM cutters manufactured by General Electric, the standard tolerances recommended are 0.009 inches per side for the brazing foil with three wraps plus 0.006 inches for a total of 0.015 inches per side between the cutter and the pocket.

Further, since the brazing techniques are mainly directed to a puddling affect where attachment is at the bottom of the cutter pocket, the cutter pocket itself is enclosed to less than 60% in commercial drill bits.

It has been found that the production cutter must be able to withstand a high degree of mechanical load. Because of this mechanical load and the inadequacy of the presently used brazing techniques, the cutters are found to be breaking off during use. Another problem found with the present cutter attachment methods is in the use of drilling fluid to clean the cuttings and cool the bit head. When high velocity fluids are passed over the drill bit head, the brazing material is eroded due in part to the gaps between the cutter and the cutter pocket.

SUMMARY OF THE INVENTION

The present invention overcomes the problems described above by a method of manufacturing a bit head having a working surface including pockets configured to prevent displacement of cutters out of the pockets in a direction transverse to the working surface.

The method includes steps for mechanically engaging the cutter pocket to the cutter and metallurgically bonding the cutter pocket to the cutter.

The preferred method of the present invention includes forming a drill bit head such that the bit head has a working surface, with a plurality of pockets configured to prevent displacement of cutters out of the pockets in a direction transverse to the working surface. The method further includes fixing the cutters in the cutter pockets. This fixing step includes a brazing technique wherein the cutter is wrapped with a braze foil such that the sides of the cutter transverse to the plane of the working surface are free of the braze foil, i.e., the bottom and back surface is wrapped with the excess braze foil protruding above the top of the cutter. The brazing technique includes a step heating the drill bit to a predetermined brazing temperature, less than the thermal degradation temperature of the cutter. The fixing step may also include heat shrinking the cutter pocket onto the cutter to achieve a mechanical engagement between the two.

The shrink fitting in the preferred embodiment is possible only due to the forming of the pockets in a dimensionally controlled fashion to achieve tolerances between the cutter and the cutter pocket less than one-half the shrinkage of the pocket. The cutter pocket is also configured to be substantially enclosed with a circumferential enclosure in the range of 335° to 345°.

The cutter is inserted into the pocket in a plane parallel to the working surface of the bit head. The pockets are formed in the preferred embodiment to be of cylindrical shape with circular cross-section to accommodate cylindrical cutters. Further in the preferred embodiment, the bit head is formed of a carbide matrix material.

Cutting blades may also be formed on the working surface of the bit head comprising a plurality of cutter pockets extending radially outward from the center of the bit head. In order to keep the bit head free of cuttings and further to provide cooling, fluid courses may also be provided on the bit head. The cooling function is also enhanced by nozzles disposed within the bit head in a plane parallel to and below the working surface. The nozzles may be of the sintered carbide type.

The brazing is accomplished in the preferred embodiment using a nickel-silver brazing foil at a brazing temperature less than 1500°, or the thermal degradation temperature of the cutter. The cutter in the preferred embodiment is a polycrystalline synthetic diamond material. The cutter cutting face is planar and in the preferred method set in the pocket at a rake angle in the range of 0° to −30°.

In the preferred embodiment to achieve the proper shrinking characteristics in the heating and cooling process the drill bit head is formed from a carbide matrix material such as carbide menstrum for example.

BRIEF DESCRIPTION OF THE DRAWINGS

Still further features and advantages of the present invention will become apparent from the following more detailed description thereof in connection with the drawings which.

DETAILED DESCRIPTION

The method of the present invention includes manufacturing drill bits and fixing cutters to the drill bits. This method overcomes the prior art problems of losing cutters made of synthetic diamond material from the drill bit head by mechanically and metallurgically fixing the cutters to the bit head. A drill bit in accordance with the present invention is structurally defined to enhance mechanical engagement of the cutter to the pockets formed on the bit head to prevent displacement of the cutters out of the pockets in a direction transverse to the working surface of the bit head.

Figure 1:
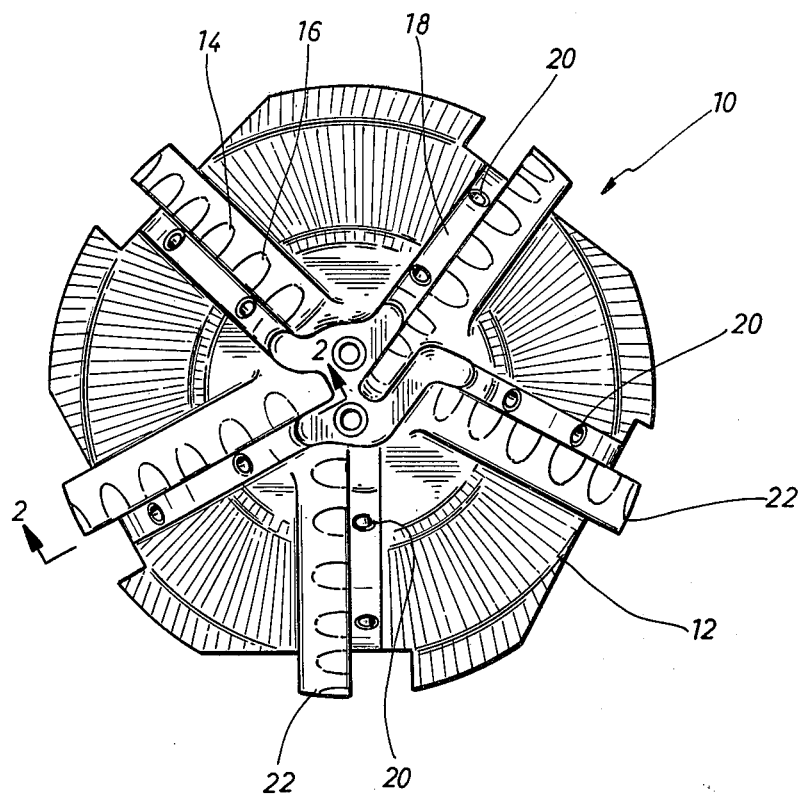
FIG. 1 is a bottom view of a drill bit head manufactured in accordance with the methods of the present invention.

Referring now to the figures and specifically to FIG. 1 where a drill bit head 10 is provided. The drill bit 10 head includes a working surface 12 having a plurality of pockets 14 adapted to receive cutters 16.

The pockets are configured to prevent displacement of the cutters 16 out of the pocket in a direction transverse to the working surface 12.

The drill bit head is further configured with fluid courses 18 and nozzles 20. The fluid courses and nozzles function to remove cuttings away from the bit head during operation, and to cool the bit head with drilling fluid. The nozzles 20 may be of the sintered carbide type and implanted in the bit head 10 so as to be in a plane parallel with and below the working surface 12.

The cutter pockets 14 are located in adjacent relationship to one another forming cutter blade bands 22. The fluid courses 18 and the nozzles 20 are disposed on the bit head 10 in a manner adjacent to the cutter bands 22 to provide the greatest affect on removing drilling material and at the same time cooling the cutters 16.

Figure 2:
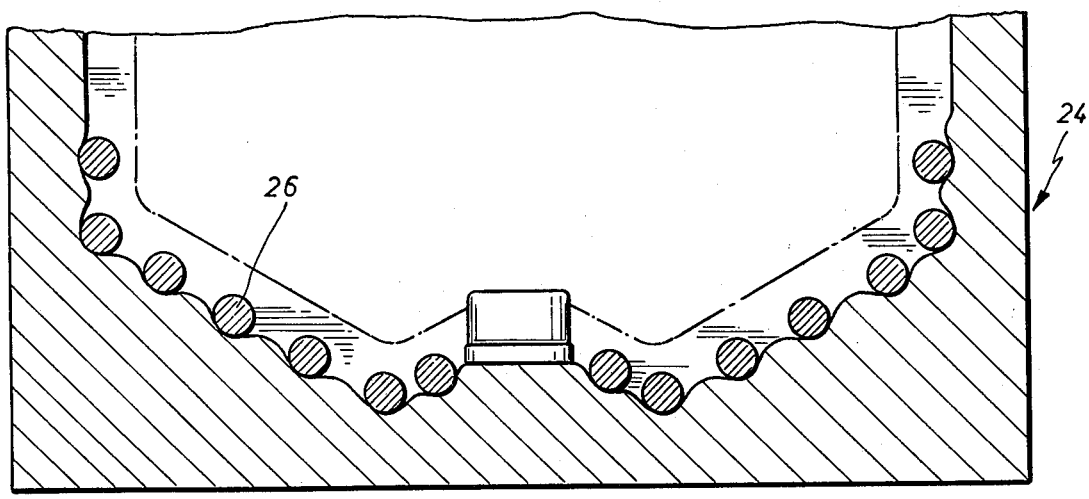
FIG. 2 is an illustration of a graphite mold to achieve the pockets illustrated in FIG. 3.

FIG. 2 illustrates a graphite mold 24 having a series of proturbances 26. This graphite mold is a cross section of a graphite mold that is utilized in the manufacture of the drill bit head 10 by powder metallurgy techniques. Using these techniques, the graphite mold is made to the shape of the bit head 10. A plurality of flats are machined into the mold at positions corresponding to the pockets to be formed in the bit head 10. At each flat a protruding mold portion 26 shown in FIG. 2 is secured to the graphite mold 24 for forming the pocket. The protruding portion 26 is shaped such that within the pocket there will be no negative relief. In accordance with known techniques, the mold 24 is first filled with a tungsten carbide powder. The mold 24 is then vibrated to compact the powder and a copper alloy binder is placed upon the powder. The filled mold is then furnaced to a temperature on the order of 2100° F. so that the copper melts and infiltrates the powder. The protruding pocket forming portion 26 of the mold 24 is sized so as to have external dimensions slightly in excess of the finished product to allow for shrinkage during the furnacing of the drill bit head 10.

The sintered carbide nozzles 20 illustrated in FIG. 1 are also included during the formation of the bit head 10 in the molding process. The nozzles 20 are implanted so as to be finally located in a plane beneath the ultimate working surface 12 of the bit head 10.

Figure 3:
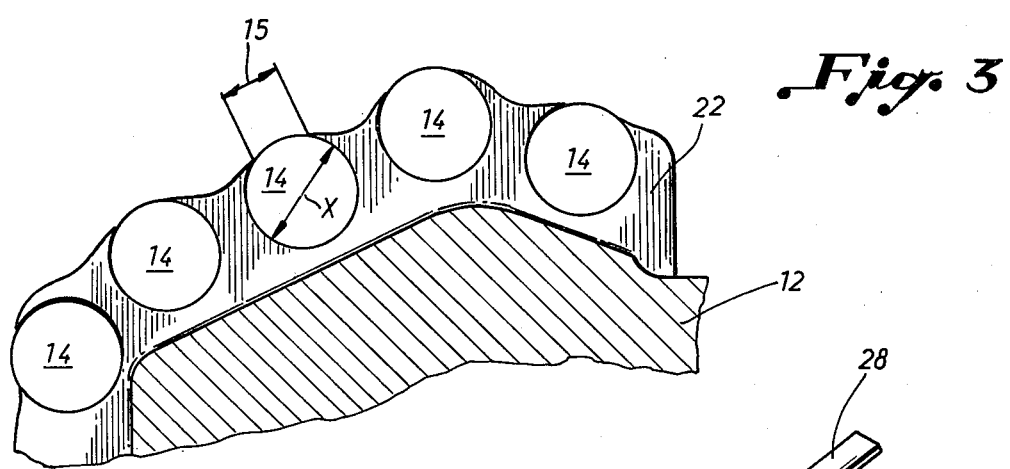
FIG. 3 is a cross-sectional view along lines 2—2 of FIG. 1 illustrating cutter pockets formed in accordance with the method of the present invention.

The cutter pockets 14 have a configuration adapted to receive the cutters 16. During the powder metallurgy process, the cutter pockets illustrated in FIG. 3 are dimensionally controlled to have a predetermined diameter. The diameter X in the preferred embodiment is on the order of 0.534 to 0.536 inches. The cutter pocket 14 illustrated in FIG. 3 is designed to be substantially enclosed having a gap 15 at the top of the pocket providing 335° to 345° coverage. This structural definition of the cutter pockets 14 inhibits the displacement of the cutters 16 out of the pocket 20 in a direction transverse to the working surface 12 of the bit head 10.

The cutters 14 associated with the drill bit head 10 in the preferred embodiment include a drill blank which comprises a synthetic polycrystalline diamond face secured to a tungsten carbide backing plate. A drill blank successfully used in accordance with the present invention is a drill blank manufactured by General Electric Corporation having a synthetic STRATAPAX TM brand polycrystalline diamond face. (General Electric Model No. 2540-T.) The cutter 14 used in the present application has a dimension of 0.528 inches in diameters. However, a pretinning blank is also contemplated which has a range of 0.530 to 0.534 inches in diameter.

As illustrated in FIGS. 1 and 3 the cutters 16 are received into the cutter pockets 14 in a fashion parallel to the working surface 12. Thus, by dimensionally controlling the pockets 14 and utilizing cutters 16 having a predetermined range of diameters, the cutters 16 will have a slip fit into the pockets 14. In the preferred embodiment, the slip fit will produce a tolerance between the cutter assembly 16 and the pockets 14 of 0.002 to 0.003 inches.

The method of the present invention includes the manufacture of a drill bit member by forming a bit head with a working surface having pockets configured to prevent displacement of cutters out the pockets in a direction transverse to the working surface. The pockets are dimensionally controlled to enable either metallurgical bonding between the pocket and the cutter, mechanical engagement of the pocket walls with the cutter or both.

Figure 4:
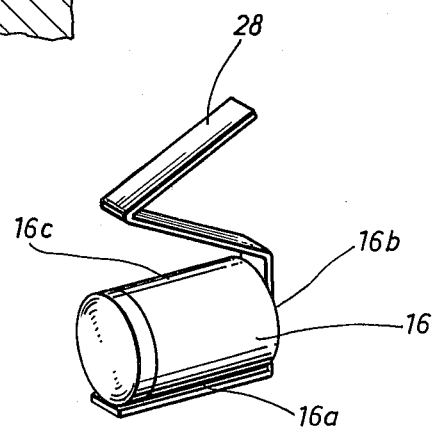
FIG. 4 is a three-dimensional drawing of the cutter insert having braze foil wrapped around the cutter in accordance with the method of the present invention.
Figure 5:
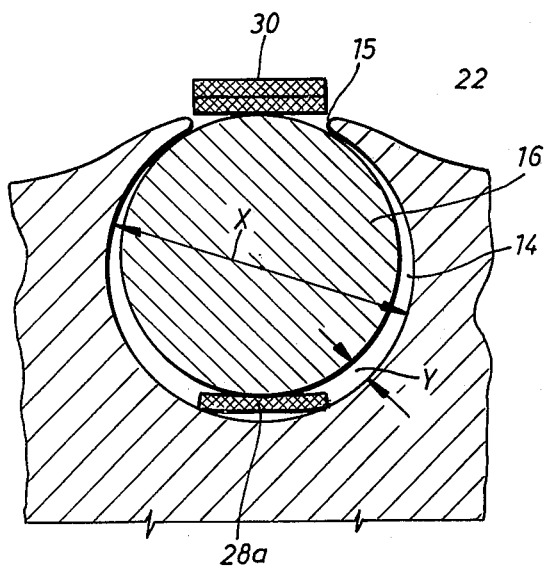
FIG. 5 is a cutter shown disposed in a pocket with a foil shim before the brazing is performed.

The metallurgical bonding step in the method of manufacturing a drill bit head such as that illustrated in FIG. 1 for example, includes a brazing technique. The brazing technique includes wrapping a braze foil around the cutters 16 as illustrated in FIG. 4. FIG. 4 demonstrates the braze foil 28 wrapped along the bottom side 16A and the back side 16B of the cutters 16. The braze foil 28 in the preferred embodiment is a nickel-silver alloy having a thickness of approximately 0.003 inches. The braze foil 28 is wrapped on the cutters 16 in a manner such that the excess foil 30 is allowed to protrude above the top side 16C of the cutters 16. Thus, when placed in the cutter pockets 14 as demonstrated in FIG. 5 the excess foil 30 protrudes through the gap 15 in the cutter pockets 14.

The braze foil 28 provides a shim 28a when placed with the cutters 16 in the pockets 14. This shim 28a displaces the cutters 16 toward the top of the pockets 14 near the gap 15. The foil wrapping 28 requires tap fitting of the cutters 16 into the pockets 14. The tolerance Y along the sides of the cutters 16 transverse to the plane of the working surface which are free of braze foil have a dimension on the order of 0.002 inches. The excess foil 30 has a volume in the range of four to six times the volume defined by the tolerance between the cutters 16 and the pockets 14.

A significant feature of this method is in defining the tolerances between the cutters 16 and the pockets 14 to enhance the metallurgical bonding and enable mechanical engagement of the cutter to the pocket. In the metallurgical bonding or brazing step after tap fitting the cutters 16 with braze foil 28 into the pockets 14, the bit head is heated to a predefined brazing temperature on the order of less than 1500° F., but less than the thermal degradation temperature of the cutters 16. During this heating operation, the pockets 14 will expand on the order of 0.006 inches thus enabling the excess foil 30 to funnel into the pockets substantially wetting the entire circumference of the cutters 16.

Finally, the method provides for a cooling step wherein the braze material 28 hardens and fixes the cutters 16 to the inside of the pockets 14.

Mechanical engagement of the cutters 16 to the pockets 14 is also provided in accordance with the method of making a drill bit of the present invention with or without the metallurgical bonding. The pockets 14, being dimensionally controlled upon heating of the drill bit head 10 illustrated in FIG. 1, will shrink fit around the cutters 16. The criticality of the dimension is such that shrink fitting is only possible to obtain a mechanical hold on the cutters if the tolerance per side is less than one-half the shrinkage of the pockets 14. Further to avoid cracking the matrix material forming the drill bit head 10, the dimensions of tolerance must be on the order of at least 10% of the shrinkage per side.

Figure 6:
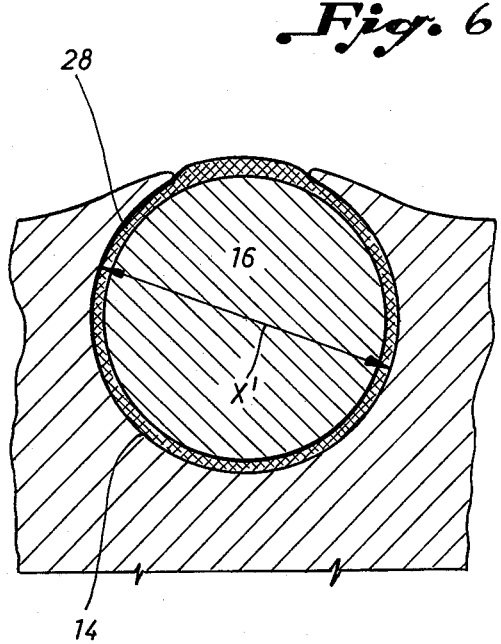
FIG. 6 is a cross-sectional view of the pocket having the cutter disposed therein after the brazing is accomplished.

FIG. 6 illustrates the result of the combination of metallurgical and mechanical bonding of the cutters 16 to the pockets 14. In this case the brazing 28 is disposed between the cutters 16 and the pockets 14 so as to substantially encompass the cutters. The heat shrinking of the cutter pockets 14 reduces the diameter of the pockets from X to X' providing a mechanical hold on the cutters 16 by the pockets 14.

The cooling step in the preferred method is performed in an inert gas or reducing environment such as hydrogen for example. The bit head is normally cooled for a period on the order of three hours.

The method whereby the pockets 14 are dimensionally controlled enables the braze material to substantially encompass the cutters 16. With the tolerances set on the order of 0.002 inches, during the shrink fitting of the pocket the braze material 28 is still in a malable condition and will be compressed to the point of oozing out of the gap 15 in the pockets 14. This reduces voids in the braze material as well as effectually eliminating puddling of the braze at the bottom of the pockets.

Standard brazing techniques include wrapping the entire circumference of the drill blank with a braze foil. General Electric suggests three wraps around the cutters plus a 0.006 tolerance between the wrapped cutters and the cutter pockets. This amounts to approximately 0.015 inches per side compared to 0.002 inches per side in the present invention. This degree of tolerance is not suitable to perform the shrink fitting and metallurgical bonding method of the present invention.

Further, increasing the number of wrappings of foil around the circumference of the cutters will not achieve the mechanical and metallurgical holding evidenced by the methods of the present invention. An increase of the wrapping will necessitate a larger diameter pocket to fit the cutters and wrapping into the pockets. It is well-known that upon heating there is a loss of about 40% volume in the braze material. Therefore the tolerances left after the heating process will be great causing puddling at the bottom of the cutter pockets and providing no mechanical hold whatsoever.

While the present invention has been described and illustrated with respect to preferred methods and apparatus, it will be understood to those skilled in the art that many changes and modifications may be made without departing from the spirit and scope of the invention as set forth in the appended claims.

I claim:

1. A method of manufacturing a drill bit comprising the steps of:
    forming a drill bit head by a powder metallurgy utilizing a graphite mold having a series of proturbences for forming pockets, the proturbances having external dimensions slightly in excess of the inner dimensions of the finished pockets to allow for shrinkage during the furnacing of the drill bit head; and,
    attaching cutters having cutting faces into said pockets by:
        forming a plurality of substantially enclosed dimensionally controlled pockets in said drill bit;
        placing brazing foil in communication with the backs and bottoms of the cutters having excess foil protruding from above the top of the cutters;
        tap fitting the cutters and braze material into the cutter pockets;
        metallurgically attaching said cutters to said cutter pockets by heating said drill bit to a predetermined brazing temperature to expand the cutter pockets thus allowing the brazed foil to funnel into the pockets and substantially encompass said cutters; and
        shrink fitting said cutter pocket to said cutter by hydrogen cooling said drill bit.

2. The method of manufacturing a drill bit as set forth in claim 1 further including the step of locating carbide sintered nozzles within the drill bit head in adjacent relationship to said cutters.

3. The method of manufacturing a drill bit as set forth in claim 1 wherein said cutters comprise drill blanks including a synthetic polycrystalline diamond face and a backing plate secured to said face.

4. The method of manufacturing a drill bit as set forth in claim 1 wherein said cutters are provided with pretinning and have a diameter in the range of 0.530 to 0.534 inches.

5. The method of manufacturing a drill bit as set forth in claim 1 wherein the drill bit head is formed from a carbide containing matrix.

6. The method of manufacturing a drill bit as set forth in claim 1 wherein said brazing material is a nickel-silver alloy foil.

7. The method of manufacturing a drill bit as set forth in claim 1 wherein said drill bit head comprises a matrix material composed of carbon menstrum.

8. A drill bit manufactured by the method of claim 1.

9. The method of manufacturing a drill bit as set forth in claim 1 wherein said pockets are dimensionally controlled to be greater than 10% of the shrinkage per side due to cooling the bit head after furnacing for metallurgical bonding to prevent shrink fitting onto the cutter that will crack the bit head.

* * * * *